Sept. 18, 1962   A. J. KOBLER   3,054,398
EYELID SPREADER
Filed Feb. 13, 1961
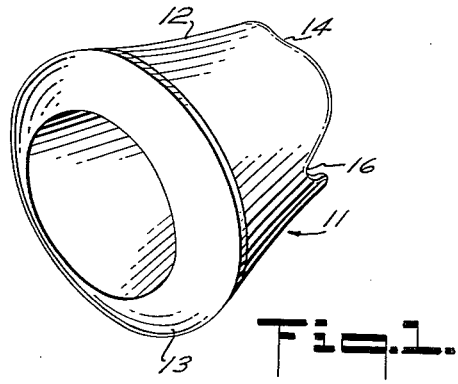
Fig.1.
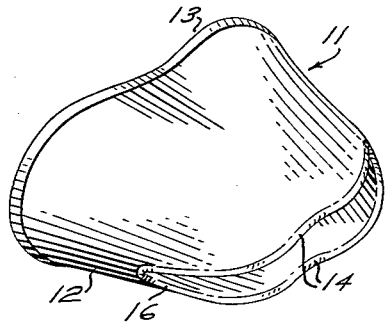
Fig.2.
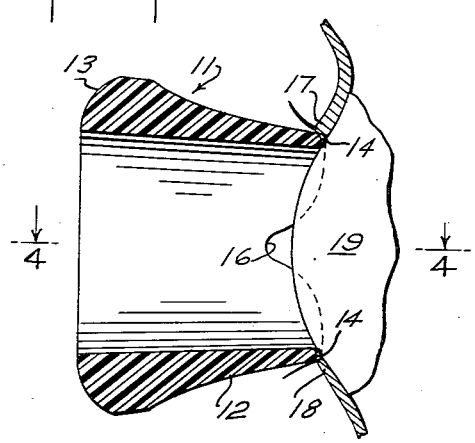
Fig.3.
Fig.4.
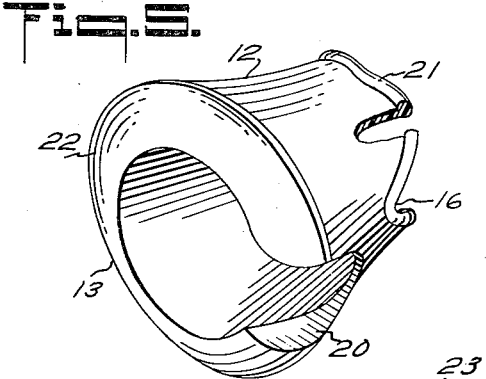
Fig.5.
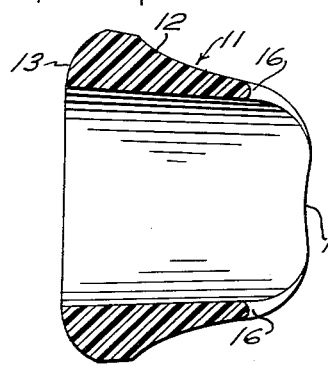
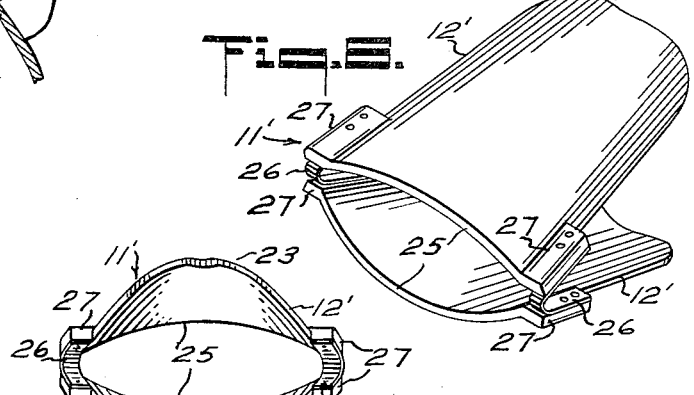
Fig.6.
Fig.7.
INVENTOR
ARNOLD J. KOBLER
BY
Gardner + Zimmerman
ATTORNEYS

United States Patent Office 3,054,398
Patented Sept. 18, 1962

3,054,398
EYELID SPREADER
Arnold J. Kobler, 706 Clay St., Fairbanks, Alaska
Filed Feb. 13, 1961, Ser. No. 88,704
6 Claims. (Cl. 128—20)

This invention relates to a device for holding eyelids in spread apart relation whereby a contact lens may be readily applied to the eyeball or other operations performed unobstructedly thereon.

When contact lenses are applied to the eyes there is a severe tendency to blink the eyelids and hence disrupt the lens inserting manipulation. Similarly, when an eye dropper or the like is operatively positioned above the eyeball and a drop is released, there is a natural reflex to flinch prior to the time the drop actually contacts the eyeball. The foregoing usually occurs even when a person holds the eyelids apart by hand, the tendency to blink being so overwhelming as to cause the person to release the lids by reflex action.

In order to prevent blinking or flinching, I have provided a mechanical device for holding eyelids apart, such device being not influenced by the sensory and motivating actions of the human mind and therefore maintaining the eye open irrespective of natural reflexes. The eyelid spreader of the present invention hence facilitates the ready application of contact lenses to the eyes by means of the applicator disclosed in my copending application, Serial No. 88,702, or by hand, the application of drops to the eyes, or any other manipulation that requires the eyes to be held open.

It is therefore an object of the present invention to provide a device for holding eyelids in spread apart relation.

Another object of the invention is the provision of a device of the class described which is easily insertable into operative position in the eye.

It is still another object of the present invention to provide an eyelid spreader which facilitates the application of contact lenses to the eyeballs by means of an applicator or in the conventional manner by hand.

Yet another object of the invention is to provide an eye lid spreader of the class described which avoids rough contact with the lids and eyeball.

A further object of the invention is the provision of a device of the class described that is extremely simple and economical in construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of the eyelid spreader.

FIGURE 2 is a perspective view of the spreader in depressed condition for easy insertion into the eye.

FIGURE 3 is a longitudinal section of the spreader as operatively positioned relative to the eye.

FIGURE 4 is a section view taken at line 4—4 of FIGURE 3, and

FIGURE 5 is a perspective view of a modified form of the spreader.

FIGURE 6 is a perspective view of a further modification of the spreader.

FIGURE 7 is an elevational view of FIGURE 6 looking into the eye engaging end of the spreader.

Referring now to the drawing, FIGURE 1 in particular there is illustrated an eyelid spreader 11 in accordance with the present invention. The spreader is generally provided as a short flexible walled tube 12 of soft flexible rubber or other resilient form retentive material, open at both ends. One end of the tube is thickened as indicated at 13 and the outer surface of the tube is generally tapered from the thickened portion towards the opposite end while the tube bore diameter is substantially constant. The end of the tube opposite from the thickened end is hence relatively thin. Such thin end, moreover, is formed to conform to the shape of an eyeball, slight curved depressions 14 being provided at diametrically opposed locations of the end rim to accommodate the generally spherical curvature of an eyeball. To complete the spreader design, a pair of diametrically opposed smoothly curved V-notches 16 are provided in the rim at positions that are circumferentially intermediate the contour depressions 14 thereof, viz., arcuately spaced substantially 90° therefrom.

With the spreader thus constructed it will be appreciated that insertion into the eye is readily accomplished by first compressing the tube 12 by urging the portions thereof on opposite sides of the V-notches 16 together as depicted in FIGURE 2. This is readily accomplished by squeezing the tube between the thumb and forefinger. With the tube compressed and held in the foregoing manner, the thin end thereof is brought towards the eye and one of the depressed rim portions is placed against the lower edge of the upper lid 17 so as to raise the lid sufficient to allow the opposed depressed rim portion to clear the upper edge of the lower lid 18. Finger pressure is then released from the tube and it expands to its normal cylindrical form, urging the lids apart in its expansion as depicted in FIGURE 3. The rim depressions 14 are at this time in contact with the eyeball 19 (see FIGURE 3). By virtue of the form retaining resiliency of the tube, sufficient pressure is exerted by the tube rim against the eyelids to overcome any forces generated by the lids in attempting to close. Hence, the spreader keeps the lids spread apart even when they attempt to close by reflex action such that a contact lens may be engaged with the eyeball, drops may be inserted into the eye, etc., without impedement.

Where an applicator is employed to apply a contact lens to an eye that is spread apart by the eye spreader 11, the applicator and lens may be inserted through the bore of the spreader tube. However, in the conventional application of a lens where it is supported upon the tip of a finger of the user it is somewhat difficult to balance the lens while the finger is inserted through the tube bore. Accordingly, to facilitate the ready finger tip insertion of a lens, the eye spreader may be advantageously modified as depicted in FIGURE 5. More specifically, a longitudinally extending slot 20 may be provided in the thickened end portion 13 of the tube 12 in opposition to one of the notches 16. Such slot is of a sufficient width to receive the forefinger of a user and thus functions as a finger access hole to enable a lens supported upon the forefinger of a user to be brought unobstructedly into close proximity with the eyeball. It has been found that the provision of the slot 20 may tend to decrease the resiliency of the tube walls and for this reason the end portion 13 is preferably formed of increased thickness especially in the area indicated by the numeral 22 diametrically opposed to the slot so as to provide increased resilience.

Other modifications to the eye spreader of the present invention are possible, and in this connection it should be noted that the eye engaging rim of tube 12 may be enlarged as depicted in FIGURE 5 to form a rounded rim 21. Such rim provides additional cushioning to the eyeball and eyelids.

A further modification of the eyelid spreader of the present invention is illustrated in FIGURES 6 and 7. In this form the wall or walls of the spreader 11' may be formed of metal, plastic, or other relatively non-resilient material and is comprised of a pair of tapered plates 12', each being substantially semi-circular in cross-section. The two plates are so positioned that the inner surfaces will be disposed in confronting relationship and so as to define a substantially elliptical opening at the eye-engaging end 23 of the spreader. The plates are secured together for such positioning preferably at the ends 25 arranged to be remote from the eye of the user, when the spreader is applied, and as here shown the attachment of the plates is effected by means of springs 26 interposed between and mounted on bosses 27 extending laterally from each side of the plates adjacent the ends 23. The ends of the springs may be secured to the respective bosses in any desired manner such as by rivets or the like. The forward end 23 of the spreader is of substantially the same configuration as that of the preceding forms so as to conform to the shape of the eyeball. As will be understood the springs 26 maintain the spreader in a normally open or expanded position and insertion of the spreader is accomplished by the user holding the spreader between the thumb and forefinger, pressing the plates together, and then positioning the end 23 against the eyeball and in contact with the lower eyelids. The finger pressure on the plates is then appropriately released so that the upper eyelid will be engaged to effect the desired separations of the lids.

What is claimed is:

1. An eyelid spreader comprising a short substantially cylindrical resilient walled tube open at both ends with one end having a generally eyeball shaped contour, the contoured end of said tube having diametrically opposed smoothly curved recessed portions therein.

2. An eyelid spreader comprising a short cylindrical flexible walled open ended tube of resilient form retentive material, said tube having a bore of constant diameter, said tube having one thickened end and an outer surface tapered in the direction of the opposite end, the thin end of said tube having a generally eyeball shaped contour and having a pair of diametrically opposed smoothly curved longitudinally extending V-notches therein.

3. An eyelid spreader according to claim 2, further defined by the thickened end of said tube having a longitudinally extending slot with a width in excess of that of a human forefinger.

4. An eyelid sperader according to claim 2, further defined by the thin end of said tube having a rounded rim.

5. An eyelid spreader comprising wall portions defining a substantially cylindrical resilient body open at both ends with one end having a generally eyeball shaped contour and being movable from a normal resiliently retained expandable relationship to a contractible relationship.

6. An eyelid spreader comprising a pair of plates each being substantially arcuate in cross-section and with one end having a generally eyeball shaped contour, and spring means securing said plates together for movement relative to one another and with the inner peripheral surfaces of the plates being in confronting relationship to define a substantially elliptical opening at the contoured end, said spring means normally retaining the contoured ends in open position.

References Cited in the file of this patent

UNITED STATES PATENTS

| | | |
|---|---|---|
| 535,298 | Seybold et al. | Mar. 5, 1895 |
| 2,702,540 | Debeh | Feb. 22, 1955 |

FOREIGN PATENTS

| | | |
|---|---|---|
| 722,852 | France | Jan. 5, 1932 |